United States Patent [19]

Wetzel et al.

[11] Patent Number: 5,405,670
[45] Date of Patent: Apr. 11, 1995

[54] POLYCARBONATE BLENDS

[75] Inventors: Donna M. Wetzel, Bensalem; David L. Dunkelberger, Newtown, both of Pa.

[73] Assignee: Rohm and Haas Company, Philadelphia, Pa.

[21] Appl. No.: 109,196

[22] Filed: Aug. 19, 1993

[51] Int. Cl.[6] .................. C08L 69/00; C08L 33/12; C08L 39/04
[52] U.S. Cl. ....................... 428/64; 428/65; 428/412; 525/148; 526/262
[58] Field of Search ............ 428/64, 65, 412; 525/148; 526/262

[56] References Cited

U.S. PATENT DOCUMENTS

| | | | |
|---|---|---|---|
| 4,491,647 | 1/1985 | Dean | 525/67 |
| 4,749,749 | 6/1988 | Munzer et al. | 525/148 |
| 4,906,696 | 3/1990 | Fischer et al. | 525/148 |
| 4,950,716 | 8/1990 | Fischer et al. | 525/148 |
| 5,073,615 | 12/1991 | Shen | 525/262 |
| 5,180,787 | 1/1993 | Shorr et al. | 525/282 |
| 5,239,021 | 8/1993 | Peleo | 525/148 |

FOREIGN PATENT DOCUMENTS

| | | |
|---|---|---|
| 483717 | 5/1992 | European Pat. Off. . |
| 548839 | 6/1993 | European Pat. Off. . |
| 162509 | 7/1986 | Japan . |
| 53316 | 3/1987 | Japan . |
| 14740 | 3/1988 | Japan . |
| 295662 | 12/1988 | Japan . |
| 229060 | 9/1989 | Japan . |
| 123149 | 5/1990 | Japan . |
| 189316 | 7/1990 | Japan . |

OTHER PUBLICATIONS

C. K. Kim et al., Polymer, vol. 33, No. 23, pp. 4929–4240 (1992).
M. Rabeony, et al., J. Chem. Phys., vol. 97, No. 6, pp. 4505–4511 (1992).
Z. Janovic et al., Makromol. Chem., vol. 194, pp. 1915–1923 (1993).
M. Nishimoto et al., Polymer, vol. 32, No. 2, pp. 272–278 (1991).
M. Nishimoto et al., Polymer, vol. 32, No. 7, pp. 1274–1283 (1991).
B. Dean, Journal of Applied Polymer Science, vol. 30, pp. 4193–4196 (1985).

*Primary Examiner*—David Buttner
*Attorney, Agent, or Firm*—Darryl P. Frickey

[57] ABSTRACT

A transparent blend composition comprising a methyl methacrylate-tribromophenyl maleimide copolymer and polycarbonate, the weight percent ratio of the copolymer to the polycarbonate being about 1:99 to about 99:1.

15 Claims, 2 Drawing Sheets

POLYCARBONATE BLENDS

FIELD OF INVENTION

This invention relates to methacrylate copolymers and blends of polycarbonate and methacrylate copolymers. It further relates to blends of polycarbonate and methyl methacrylate-tribromophenyl maleimide copolymers. These blends are miscible and have excellent transparency and thermal resistance. It further relates to processes, articles and uses of these blends.

BACKGROUND OF INVENTION

The object of the invention is to provide a polymer blend with excellent transparency and thermal resistance. Applicants have found that incorporating tribromophenyl maleimide comonomer into a methyl methacrylate polymer provides for methyl methacrylate-tribromophenyl maleimide copolymers which exhibit enhanced miscibility with polycarbonate, such that melt-processible blends of polycarbonate having excellent transparency and thermal resistance over the entire range of blend compositions (from 99% of methacrylate copolymer to 99% of polycarbonate) are possible.

Polymer blends are very important to the plastic industry and are well known. Miscible polymer blends, often referred to as polymer alloys, are desirable and useful because they provide a unique combination of properties from two or more polymers, that one polymer alone cannot provide. In particular, blend polymers such as polymethyl methacrylate (pMMA) and polycarbonate, for example, bisphenol-A polycarbonate (PC) would be highly desirable and commercially useful materials for producing miscible transparent polymer blends. These materials are desirable and useful because pMMA is a clear, relatively inexpensive polymer with excellent light transmission and resistance to sunlight and PC is a clear polymer, with the advantageous properties of toughness and high heat resistance. Unfortunately, pMMA lacks heat resistance and is brittle, so it cannot be used in all applications and PC is a relatively expensive polymer. It is therefore desirable to achieve fully miscible polymer blends of pMMA and PC. Such blends would offer variable property/cost behavior properties based on blend ratios of pMMA and PC between the limits of pure pMMA and pure PC, while maintaining optical clarity.

Unfortunately, pMMA and PC are known not to be compatible or miscible. Melt processed blends of pMMA and PC having commercially useful molecular weights, such as weight average molecular weights of about 70,000 or more, are not homogeneous. Phase separation of such blends occurs at temperatures just above the glass transition temperature of the blend. The melt processing temperature required for polycarbonate or PC is typically 100 degrees Celsius (°C.) above its glass transition temperature (Tg), and in this case about 100° C. above the Tg range for polycarbonates, of 150° C. to 250° C., and at that processing temperature, blends of pMMA and PC are inhomogeneous and opaque, and have undesirable mechanical properties. It is therefore desirable to achieve a blend of pMMA and PC that remains as a single phase at melt-processing temperatures.

The "cloud point temperature" is an important factor in blend miscibility, as it is the temperature at which the blend changes from clear to "cloudy," because of phase separation. To be melt-processible, the cloud point of the PC and MMA copolymer blend should be $\geq 250°$ C. If a comonomer is not particularly efficient at altering the phase behavior of the blend, a large amount of the comonomer must be added, thus raising the expense of the copolymer and/or changing the physical properties of methyl methacrylate polymer.

Examples whereby the phase behavior of PC and pMMA has been altered by chemical modification exist in the literature. Examples of known art are discussed below as are the deficiencies of this known art and hence illustrate the advantages of the present invention.

In the closest known reference, U.S. Pat. No. 4,491,647 ('647) discloses a partially miscible blend or a polyblend of polycarbonate and N-phenylmaleimidemethyl methacrylate copolymer. These partially miscible blends are taught as ternary compatibilizers for polycarbonates with acrylonitrile-butadiene-styrene (ABS) resins or rubber-modified styrene-maleic anhydride resins.

Additional references teach comonomers polymerized with methyl methacrylate 25 to improve the thermal stability, but which hinder miscibility with PC. For instance, U.S. Pat. No. 5,073,615 and JP 61-162,509 both teach the copolymerization of methyl methacrylate with various N-substituted maleimide compounds, including methyl, ethyl, phenyl and cyclohexyl maleimide. Many of these maleimides, however, render the methacrylate copolymer incompatible with PC resin, particularly phenyl maleimide (PMI), as discussed earlier in '647. While cyclohexyl maleimide enhances the miscibility with PC, it is not an efficient comonomer in altering the phase behavior, and as such does not raise the cloud point sufficiently that all blend ratios are melt-processible. U.S. Pat. No. 4,950,716 demonstrates the copolymerization of cyclohexyl maleimide and the like with methyl methacrylate, but shows that the cloud points of the blends were not sufficiently raised such that some blend compositions were opaque after melt-processing.

EP 483,717 teaches copolymerization of methyl methacrylate with ring-halogenated phenyl methacrylate, for example tribromophenyl methacrylate. While the tribromophenyl methacrylate comonomer appears to be somewhat efficient at raising the cloud point temperature of the blend, relatively large amounts of the comonomer need to be incorporated into the copolymer, for instance $\geq 20$ weight percent (wt. %). Further, tribromophenyl methacrylate has the ability to homopolymerize, and its incorporation into a copolymer with methyl methacrylate is not straightforward. Special synthetic techniques are required to prevent homopolymerization of the comonomer, which would result in formation of an opaque copolymer.

Therefore, in all known references, there are deficiencies with the approaches used to achieve fully miscible blends of pMMA and PC that can be melt-processed. Deficiencies include the molecular weights of the polymers must be reduced, or the comonomer added to methyl methacrylate is not efficient or is difficult to polymerize or adds great expense, or comonomer, such as methacrylate based esters undesirably change the properties of the methacrylate copolymer especially with regard to thermal stability. In the case where termonomers are needed to enhance thermal stability, often miscibility with PC is diminished or expense is added for the manufacture of the copolymer. Applicants have overcome these deficiencies with this invention.

SUMMARY OF INVENTION

Applicants have discovered that by incorporating a very efficient and effective comonomer, namely tribromophenyl maleimide, into a polymer composed predominantly of methyl methacrylate, both the thermal stability of the copolymer and the compatibility of the copolymer with polycarbonate, such as PC, are advantageously increased. Applicants found that tribromophenyl maleimide does not homopolymerize, thus it is possible to form a transparent (sans tribromophenyl maleimide homopolymer) and thermally stable methyl methacrylate-tribromophenyl maleimide copolymer by conventional polymerization procedures. With tribromophenyl maleimide in the copolymer, melt-processible blends of methacrylate copolymer and polycarbonate over the entire range of blend compositions (from 99% methacrylate copolymer to 99% polycarbonate) are possible. Usage of tribromophenyl maleimide comonomer in the copolymer may range from 10–80 weight percent, preferably from 10–50 weight percent, and most preferably from 10 to 20 weight percent tribromophenyl maleimide in the copolymer. Since only a small amount of the comonomer needs to be incorporated into the methacrylate copolymer, manufacture of the copolymer does not involve great expense. A melt-processible polymer blend with excellent transparency and thermal resistance is possible, having a commercially useful molecular weight of 50–500,000 and preferably 100–200,000 weight average molecular weight, and satisfying a broad range of properties by alloying polycarbonate and a methacrylate copolymer containing tribromophenyl maleimide. Based on applicants' discovery, the following has been found: a transparent copolymer composition comprising methyl methacrylate polymer and tribromophenyl maleimide comonomer, the weight percent ratio of the polymer to the comonomer being about 90:10 to about 20:80, and the glass transition temperature equal or greater than 133° C.; a melt-processible blend composition comprising a methyl methacrylate-tribromophenyl maleimide copolymer and polycarbonate, the weight percent ratio of the copolymer to the polycarbonate being about 1:99 to about 99:1; and a process for producing the melt-processible blend composition, comprising the steps of: (a) preparing a copolymer of methyl methacrylate and tribromophenyl maleimide; and (b) blending the copolymer and the polycarbonate.

DETAILED DESCRIPTION OF THE INVENTION

Figure 1:
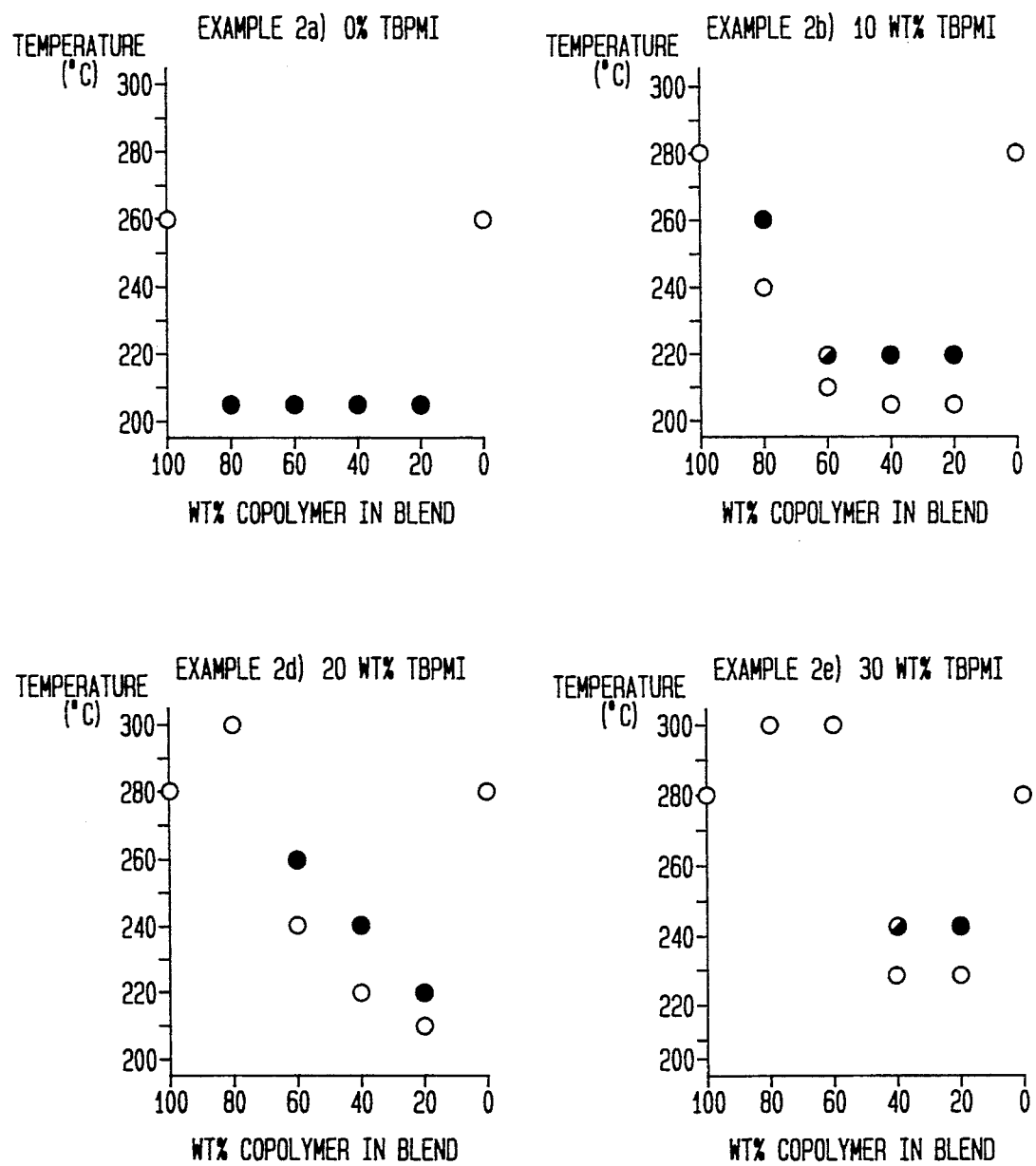
FIG. 1 is plots of DSC results of examples which tested tribromophenyl maleimide.

Phase behavior and achieving single phase blends is a function of many factors, particularly polymer molecular weight (MW) and the polymer-polymer interactions involved. For PC and pMMA systems, the polymer-polymer interactions are very weak, such that the phase behavior of the blend is very sensitive to the molecular weight and molecular composition of the polymers. It is not very advantageous to reduce the molecular weights of the polymers to achieve a homogeneous blend at melt-processing temperatures, since the mechanical properties of the polymers also decrease. It is possible, however, to alter the molecular composition of one or both of the polymers, either by incorporating comonomer(s) or functionalizing polymer side chains, and thereby raising the temperature at which the blend will be homogeneous. Applicants have found a comonomer which can be copolymerized with methyl methacrylate enabling PC and methyl methacrylate copolymer blends which are transparent, themal resistant and cost effective.

A. Copolymer Synthesis: The copolymer of the present invention is composed of methyl methacrylate and tribromophenyl maleimide, designated herein as "MMA/TBPMI". The copolymerization can be conducted by any of the typical methods, for instance bulk, solution or emulsion polymerization. The copolymer exemplified in the examples was made by free radical emulsion copolymerization. Applicants prepared various compositions of the copolymer, and of particular interest are compositions 100/0, 90/10, 85/15, 80/20, and 70/30 MMA/TBPMI, where the amounts shown are weights ratios of the MMA/TBPMI monomers. Initiators, chain transfer agents and soaps (in the case of emulsion polymerization) can be used, according to widely known and practiced polymerization techniques. By varying the amounts of initiator, chain transfer agent and soap, the degree of polymerization, molecular weight, and the particle size, respectively, can be controlled. For specific procedures used to prepare the copolymers, see section A.1 Synthesis Examples.

B. Copolymer Blends with PC: By incorporating tribromophenyl maleimide into a methyl methacrylate copolymer, it is possible to raise the cloud point temperature such that a blend of polycarbonate, such as PC and MMA/TBPMI copolymer, remains as a single phase at melt-processing temperatures. In order to demonstrate the usefulness of the present invention, a description of the phase behavior as a function of temperature and blend composition is necessary. As shown herein, MMA/TBPMI copolymers form single phase blends with PC, at all blend ratios, at the temperature required for melt processing.

Polycarbonates useful herein generally have a Tg ranging from about 100° C. to about 300° C., and these polycarbonates include bisphenol A polycarbonate, as exemplified herein, and which is also known as poly(oxycarbonyloxy-1,4-phenyleneisopropylidene-1,4-phenylene).

The polycarbonates to be used in this invention are any known in the art, but the ones based on bisphenol A reacted with carbonyl chloride in an interfacial process to produce bisphenol-A polycarbonate (PC) are preferred due to their commercial importance and availability.

A fully miscible polymer blend, that is, a blend that consists of one phase at the temperature of interest, evidences itself as a clear material with a single glass transition temperature ($T_g$). A number of methods can be used to demonstrate that a blend is miscible. The most typical method is one in which the polymers are blended in a given blend ratio and dissolved in a solvent. The solvent solution is cast into a film, and the film examined for clarity or the presence of a single $T_g$. If the blend is not fully miscible, the film will be opaque at room temperature, or become opaque as the film is heated. The film will also exhibit more than a single glass transition temperature.

Unfortunately, erroneous conclusions about the miscibility of a blend can be made, because phase behavior depends critically on method of preparation. It is possible with the solvent-preparation procedure to trap a non-equilibrium yet homogeneous state, such that the blend appears to be miscible. In particular, poor estimates of the extent of miscibility between PC and pMMA have been reported in the literature. The most reliable method for sample preparation is melt-blending, using mixing equipment such as a Haake Rheocord, manufactured by Haake Company, or a Brabender Plasticord, manufactured by C. W. Brabender Company. The phase behavior of melt-blended samples is free from the interfering effects of a solvent. Demonstrating the temperature dependence of blend phase behavior, however, is difficult by melt-blending, because of changes in the melt viscosity. Typically, samples of PC are melt-blended only at one temperature, the "optimal" melt-processing temperature, which is about 250° C.

The blend may be formed by conventional mixing of polymeric resins, powders or pellets, such as by tumbling, drum mixing, and the like, or may be compounded by means such as roll mills. Preferred is a single- or twin-screw extruder, which may also be used to form pellets of the melt-compounded blend for further processing, or may directly conduct the melt to a separate zone or zones suitable for injection molding or extrusion into sheet material, for blow molding or the like. The extruder may be equipped with a devolatilizing vent.

The temperature dependence of blend phase behavior can be approximated by methods known as "cloud point determination" methods. Cloud point temperatures are typically estimated by heating solution-cast film samples of a hot-stage microscope. Since blends such as PC/pMMA exhibit slow phase separation, the hot-stage microscope method often results in an "overestimate" of the cloud point. And as noted above, the observed cloud point behavior is not necessarily indicative of the thermodynamic phase behavior.

Applicants therefore developed a differential scanning calorimetry (DSC) experiment as exemplified, to estimate cloud points and to demonstrate how incorporation of tribromophenyl maleimide increases the cloud point of the PC/copolymer blend. "Precipitated polymer" blends samples were prepared, as described below. Applicants bracketed apparent cloud points for blend compositions ranging from 100% copolymer through 100% PC. The copolymers examined were of MMA/TBPMI composition (wt. %) 90/10 (example 1b), 80/20 (example 1d) and 70/30 (example 1e). Applicants also examined a "control" pMMA polymer (Plexiglas® V811 acrylic resin), a "control" polycarbonate polymer (Makrolon® 2808 polycarbonate), and a "control" copolymer, MMA/PMI (example 1f).

Generally, the blends taught herein are useful as transparent materials, films, plates, shaped articles, molded items for optical purposes such as lenses, prisms, optical wave guides, optical disk substrates, and construction materials, where durable, tough, weatherable, and clear features are desired.

Applications for these blends with excellent transparency, thermal resistance and toughness include markets such as automotive, sheet (glazing), retail displays, signs, electronics, business machines, lighting, industrial guards, restaurant fixtures, art/document preservation and appliances, as well as a number of specialty niches such as compact disks, ophthalmic lenses, medical, riot-control equipment, transparent mixing tanks, aircraft canopies and sports equipment such as helmet masks and athletic playing field enclosures or fencing.

Automotive applications include tail and side marker lights, headlamps, and supports. Polycarbonate blends are being used in instrument panels as well as bumpers. An extremely high potential for polycarbonate blends exists with exterior body parts such as body panels and wheel covers. Other uses include traffic light housings, signal lenses, trim and vehicle glazing (windows).

Clarity, toughness, and high-heat properties make polycarbonate ideal for glazing applications. With the appropriate UV stabilizer, polycarbonate can replace glass and impact modified acrylic sheet for use in signs, displays and vandal-proof glazing applications, such as windows and doors in schools, buildings or homes, or for outdoor lighting. Ophthalmic lenses and safety glasses are important applications. Hard coatings are available to increase durability of lenses and glasses.

Electronics and business machines are also a major market segment. Applications include connectors, breaker boxes, gears, computer housings, copier housings, and tape housings. A new application is in laser-read compact recording disks that provide superior high-density recording quality as well as durability.

Appliances consume polycarbonate in sizable volumes. High impact, heat, and durability provide design flexibility for vacuum sweepers, kitchen appliances such as mixing bowls, refrigerator doors and power tools.

Food-contact applications include water bottles for water dispensers, microwave ovenware, beer mugs and pitchers, tableware, restaurant trays and food storage containers. These products can be designed to be attractive, clear and virtually unbreakable.

Medical applications also provide high potential growth based on clarity and relative break-resistance. Sterilization of containers and packages by steam, ethylene oxide, and gamma radiation are often required. Polycarbonate performs well in this area since the introduction of grades that can be sterilized with gamma radiation without objectionable color change.

Building and construction applications are a relatively untapped market segment where polycarbonate or its blends could be used if cost-competitive with traditional building materials. Applications include skylights, architectural glazing, windows, kitchen cabinets and sliding glass doors.

Concerns about weathering, chemical resistance and scratch resistance can be minimized by the use of additives, plastic or polymer coatings, or coextrusion technology.

The individual components of the blend may contain additives normally found in such materials when purchased commercially. For example, the polycarbonate and methyl methacrylate may contain one or more impact modifier, thermal stabilizer, ultraviolet stabilizer, antioxidant or the like.

Polycarbonate, methyl methacrylate-tribromophenyl maleimide copolymer, and blend performance and versatility may be enhanced by the use of various additives such as thermal stabilizers, ultraviolet stabilizer, mold release agents, glass fibers, ignition-resistant additives, processing aids, antioxidants, impact modifiers, colorants, color concentrates, flame retardants, lubricants, pigments, and fillers.

Having described the materials and methods of this invention, the following examples are presented to illustrate the invention, but not to limit it.

EXAMPLES

In the following examples, all parts and percentages are by weight unless otherwise indicated.

A.1 Synthesis Examples: The following specific examples exemplify preparation of copolymers tested in blends with PC:

1(a) 34 parts water and 0.01 parts sodium carbonate were added to a 3 liter reaction flask. The contents of the flask were purged with a stream of nitrogen gas and heated to 80° C. A separate monomer mixture was prepared, containing 44 parts of methyl methacrylate, 0.9 parts of n-dodecyl mercaptan, 1 part sodium dodecyl benzene sulfonate, 0.4 parts sodium bistridecyl sulfosuccinate, 0.01 parts sodium carbonate and 13 parts water. 9% of this separate monomer mixture was added to the reaction flask, along with 0.006 parts sodium persulfate and 1 part water. After five minutes 20% of a solution composed of 0.02 parts sodium persulfate solution and 6 parts water was added. The remainder of the separate monomer mixture and the sodium persulfate solution were added dropwise over 3 hours. The contents of the reaction flask were held at 80° C. for an additional hour, and then cooled and filtered. The copolymerization reaction went to high (>95%) conversion. Powder was obtained by spray-drying the reaction product.

1(b) A copolymer was prepared by method 1(a), except that 39.6 parts of methyl methacrylate and 4.4 parts of tribromophenyl maleimide were used.

1(c) A copolymer was prepared by method 1(a), except that 37.4 parts of methyl methacrylate and 6.6 parts of tribromophenyl maleimide were used.

1(d) A copolymer was prepared by method 1(a), except that 35.2 parts of methyl methacrylate and 8.8 parts of tribromophenyl maleimide were used.

1(e) A copolymer was prepared by method 1(a), except that 30.8 parts of methyl methacrylate and 13.2 parts of tribromophenyl maleimide were used.

1(f) A copolymer was prepared by method 1(a), except that 39.6 parts of methyl methacrylate and 4.4 parts of phenyl maleimide were used.

A summary of the physical properties of copolymer 1(a)-1(f) appears in Table I. Included in Table I are properties of the other resins used in the polymer blend experiments, namely polymethyl methacrylate (Plexiglas® V-811 acrylic resin, a product of Rohm and Haas Company) and bisphenol-A polycarbonate (Makrolon® 2808 polycarbonate, a product of Miles Company). The copolymer compositions of examples 1(a)-(f) were verified by elemental analysis, specifically, percent (%) bromine analysis. The molecular weights are weight averages obtained from gel-permeation chromotography (GPC) measurements relative to a polymethyl methacrylate standard. Glass transition temperatures were measured by DSC, in air, at a scanning rate of 20° C./min. Five percent (5%) weight loss temperatures were measured by thermal gravimetric analysis (TGA), in air, at a scanning rate of 20° C./min. Examples 1(d) and 1(f) contain equimolar amounts of phenyl maleimide moiety, either with bromine atoms (example 1(d)) or without bromine (example 1(f)). In comparing copolymers containing equimolar amounts of tribromophenyl maleimide (TBPMI) and phenyl maleimide (PMI), TBPMI demonstrates advantages of higher Tg and better compatibility than PMI in methyl methacrylate. Comparisons between copolymers 1(a)-1(f), described in section B, demonstrate the efficiency with which tribromophenyl maleimide enhances miscibility with PC (examples 1(b)-1(e)).

Tribromophenyl maleimide is commercially available as Actimer FR 1033, a product of the Dead Sea Bromine Group. Actimer FR 1033 is the 2,4,6-tribromophenyl maleimide isomer of tribromophenyl maleimide.

TABLE I

| Example | Copolymers Composition (weight %) | Composition (molar %) | Mw | Tg(°C.) | 5% wt. loss (°C.) | Molded Sample Appearance |
|---|---|---|---|---|---|---|
| | MMA/TBPMI | | | | | |
| 1a | 100/0 | — | 2.00E + 05 | 119 | 310 | transparent |
| 1b | 90/10 | — | 2.50E + 05 | 133 | 320 | transparent |
| 1c | 85/15 | — | — | — | — | transparent |
| 1d | 80/20 | 94/6 | 2.10E + 05 | 141 | 335 | transparent |
| 1e | 70/30 | — | 1.90E + 05 | 148 | 340 | N/D |
| | MMA/PMI | | | | | |
| 1f | 90/10 | 94/6 | 2.40E + 05 | 134 | — | N/D |
| Plexiglas V-811 | MMA | — | 1.30 + 05 | 118 | — | transparent |
| Makrolon 2808 | PC | — | 7.30E + 04 | 150 | — | transparent |

N/D = No Data

2(a) Dilute solutions (5 wt. %) were made in tetrahydrofuran (THF) solvent. Blend of this example consisted of pMMA (Plexiglas® V-811 acrylic resin) and PC (Makrolon® 2808 polycarbonate). Six solutions were prepared, consisting of 20 grams of THF and 1 gram total polymer in these weight ratios: 1) 100 wt. % pMMA, 2) 80 wt. % pMMA and 20 wt. % PC, 3) 60 wt. % pMMA and 40 wt. % PC, 4) 40 wt. % pMMA and 60 wt. % PC, 5) 20 wt. % pMMA and 80 wt. % PC, and 6) 100 wt. % PC. "Precipitated polymer" blend samples were made by adding each solution to a twenty-fold excess of methanol (the "nonsolvent"). The precipitated polymer blend was collected on a buchner funnel, dried for 1 hr. in a 70° C. oven with a steady stream of air, and further dried in a vacuum oven for 5 days at 150° C. This precipitation method eliminates some of the effects of solvent interactions and is therefore the preferred method of blend sample preparation.

2(b) Precipitated polymer blend samples were made as in 2(a), except that in place of the Plexiglas® V-811 acrylic resin, 1(b) was used. The samples were dried in 2 days in a hood at room temperature, 2 days in a vacuum oven at 85° C. and finally for 1 hr. at 150° C.

2(d) Same as 2(a), except: that in place of Plexiglas® V-811 acrylic resin, copolymer 1(d) was used.

2(e) Same as 2(a), except that in place of Plexiglas ® V-811 acrylic resin, copolymer 1(e) was used.

2(f) Same as 2(a), except that in place of Plexiglas ® V-811 acrylic resin, copolymer 1(f) was used.

B.2 DSC experiments. Samples 2(a)1-6, 2(b)1-6, 2(d)1-6, 2(e)1-6 and 2(f)1-6 were all subjected to the following DSC experiments using a heating rate of 20° C./min. and a quenching rate of 500° C./minute.

In the DSC experiment, each blend sample was subjected to multiple heating cycles. The blend was first heated to just above the glass transition temperature, quenched, and then annealed for 15 minutes at a selected temperature. The sample was then quenched and heated once again to just above the glass transition temperature. After the final heating, the sample was inspected for clarity. When the selected annealing temperature was at or above the cloud point, the sample looked opaque. When the annealing temperature was below the cloud point, the sample look transparent. In this way, a blend "phase diagram" was estimated, and cloud point temperature was bracketed. In some case, the observation of single or double $T_g$ peaks in the thermograph was also used to determine whether the sample had undergone phase separation. Since some of the copolymers have $T_g$'s very similar to that of PC, double peaks overlapped.

The results from the DSC experiments are shown in the plots of FIG. 1. Temperatures as a function of copolymer/PC blend composition is plotted. The temperature on the y-axis correspond to the annealing temperature of the experiment. An open circle indicates that a transparent sample was observed after the heating cycle; a filled circle indicates that an opaque sample was observed. For example, blend example 2(a) (80 wt. % pMMA and 20 wt. % PC) was opaque after annealing at 200° C. Another example is blend example 2(b) (80 wt. % copolymer 1(b) and 20 wt. % PC), which was transparent after annealing at 240° C., but opaque after annealing at 260° C. The cloud point for blend example 2(b) (80 wt. % copolymer 1(b) and 20 wt. % PC) is therefore estimated to be between 240° and 260° C. The DSC experiments clearly show that incorporating tribromophenyl maleimide into the methyl methacrylate polymer raises the cloud point of the blend.

The plots in FIG. 1 show how the apparent cloud point temperature increases with increasing amount of TBPMI in the copolymer. All blends ratio of pMMA/PC (examples 2(a)1-6) had cloud points below 200° C. When 20 wt. % TBPMI is incorporated into the methacrylate copolymer (examples 2(d)1-6), all blend ratios exhibited cloud points above 215° C. With 30 wt. % TBPMI in the copolymer, (examples 2(e)1-6) all the blends ratios exhibited cloud points above 220° C. Some of the blend ratios of examples 2(d) and 2(e) remained clear even after annealing above 300° C.

As noted above, the observed cloud point behavior of samples prepared from solution blends is not necessarily indicative of the thermodynamic phase behavior. Owing to the difficulty of varying temperature during melt-blending, however, the DSC experiments serve as a useful qualitative demonstration of the invention. The melt-blend experiments described below quantitatively demonstrate that MMA/TBPMI copolymers form fully miscible blends with PC at the desirable processing temperature.

B.3 Melt-blended examples. The following samples were melt-blended with a Haake Rheocord, at 250° C., for 3 mins. at a mixing speed of 60 rpm.

3(a) The blends of this example consisted of pMMA (of example 1(a)) and PC (Makrolon ® 2808 polycarbonate). Six blend ratios, by weight, were prepared: 1) 100 wt. % pMMA, 2) 80 wt. % pMMA and 20 wt. % PC, 3) 60 wt. % pMMA and 40 wt. % PC, 5) 20 wt. % pMMA and 80 wt. % PC, and 6) 100 wt. % PC.

3(b) Same as 3(a), except copolymer 1(b) was used instead of pMMA.

3(c) Same as 3(a), except copolymer 1(c) was used instead of pMMA.

3(d) Same as 3(a), except copolymer 1(d) was used instead of pMMA.

3(e) Same as 3(a), except copolymer 1(e) was used instead of pMMA.

3(f) Same as 3(a), except copolymer 1(f) was used instead of pMMA.

The results of the melt-blend experiments are shown in Table 2. All blend ratios of example 3(a), having 0 wt. % TBPMI in the copolymer, were opaque when melt-blended at 250° C. Some of the blend ratios of example 3(b), consisting of 10 wt. % TBPMI in copolymer, were transparent, depending on the amount of copolymer used in the blend, and some were opaque, when melt-blended at 250° C. All of the blend ratios of examples 3(c), 3(d) and 3(e), having 15, 20 and 30 wt. % TBPMI in copolymer, respectively, were transparent when melt-blended with PC at 250° C. Therefore, by incorporating between 10<wt. %<30 TBPMI in the copolymer, it is possible to form single phase blends with PC, at temperatures required for melt processing.

TABLE 2

Blends Containing Copolymers - Sample Appearance. Column headings indicate example number and wt % Copolymer/PC in the blend.
(C = Copolymer)

| Example | wt % TBPMI in Copolymer | 80/20 wt % C/PC | 60/40 wt % C/PC | 40/60 wt % C/PC | 20/80 wt % C/PC |
| --- | --- | --- | --- | --- | --- |
| 3a | 0 | opaque | opaque | opaque | opaque |
| 3b | 10 | transparent | transparent | opaque | opaque |
| 3c | 15 | transparent | transparent | transparent | transparent |
| 3d | 20 | transparent | transparent | transparent | transparent |
| 3e | 30 | transparent | transparent | transparent | transparent |

Note: Blend ratios of 0/100 and 100/0 (pure PC and pure pMMA, respectively) are transparent when molded as shown in Table 1 (Examples Makrolon 2808 and 1a).

B.4 Comparative Example: TBPMI vs PMI

Applicants directly compared copolymers containing equimolar amounts of tribromophenyl maleimide (TBPMI) and phenyl maleimide (PMI), in order to demonstrate the advantage of TBPMI over PMI. Melt-processed blend examples 3(d) and 3(f) were compared; the results are shown in Table 3. Whereas 6 mole % TBPMI in the copolymer results in transparent blends at all blend ratios at 250° C., the non-brominated copolymer analog containing 6 mole % PMI results in opaque blends at all blend ratios.

TABLE 3

TBPMI Copolymer vs PMI Colpolymer - Sample appearance.
Column headings indicate example number and wt % Copolymer/PC in blend.
(C = Copolymer)

| Example | Molar Amt. of maleimide in Copolymer | 80/20 wt % C/PC | 60/40 wt % C/PC | 40/60 wt % C/PC | 20/80 wt % C/PC |
|---|---|---|---|---|---|
| 3d | 6% TBPMI | transparent | transparent | transparent | transparent |
| 3f | 6% PMI | opaque | opaque | opaque | opaque |

Figure 2:
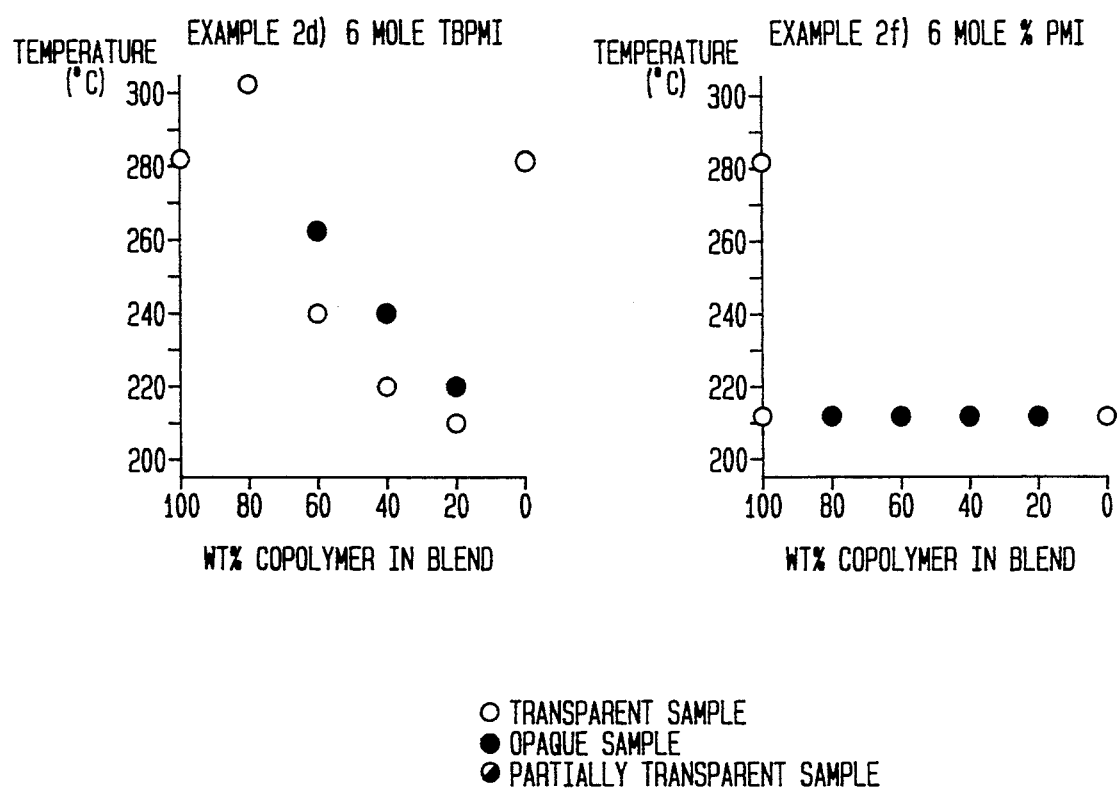
FIG. 2 is plots of DSC results which compare tribromophenyl maleimide to phenyl maleimide.

DSC experiments were also conducted on examples 2(d) and 2(f). As shown in the plots in FIG. 2, all blend ratios of examples 2(f)1-6, with 6 mole % PMI in copolymer, had apparent cloud points below 210° C. Blends with 6 mole % TBPMI incorporated into the copolymer, examples 2(d)1-6, exhibit apparent cloud points above 215° C. for all blend ratios.

While the invention has been described with reference to specific examples and applications, other modifications and uses of the invention will be apparent to those skilled in the art without departing from the spirit and scope of this invention as defined in the claims.

We claim:

1. A melt-processible blend composition comprising a methyl methacrylate-tribromophenyl maleimide copolymer and polycarbonate, the weight percent ratio of the copolymer to the polycarbonate being about 1:99 to about 99:1.

2. The melt-processible blend composition of claim 1 wherein the methyl methacrylate-tribromophenyl maleimide copolymer comprises methyl methacrylate and tribromophenyl maleimide at a weight percent ratio of about 90:10 to about 20:80.

3. The melt-processible blend composition of claim 2 wherein the weight percent ratio is about 90:10 to about 70:30.

4. The melt-processible blend composition of claim 3 wherein the weight percent ratio is about 80:20.

5. The melt-processible blend composition of claim 1 wherein the polycarbonate is bisphenol-A polycarbonate.

6. A transparent film, article or molded material made from the melt-processible blend composition of claim 1.

7. A sky-light made from the melt-processible blend composition of claim 1.

8. A window made from the melt-processible blend composition of claim 1.

9. A door made from the melt-processible blend composition of claim 1.

10. A laser read compact recording disk made from the melt-processible blend composition of claim 1.

11. A sign made from the melt-processible blend composition of claim 1.

12. An athletic playing field enclosure made from the melt-processible blend composition of claim 1.

13. Vehicle glazing made from the melt-processible blend composition of claim 1.

14. A process for producing a melt-processible blend composition comprising methyl methacrylate-tribromophenyl maleimide copolymer and polycarbonate, the weight percent ratio of the copolymer to the polycarbonate being about 1:99 to about 99:1, comprising the steps of:
   (a) preparing a copolymer of methyl methacrylate and tribromophenyl maleimide; and
   (b) blending the methyl methacrylate-tribromophenyl maleimide copolymer and polycarbonate.

15. The process of claim 14 wherein the polycarbonate is bisphenol-A polycarbonate.

* * * * *